(12) United States Patent
Kovacs et al.

(10) Patent No.: US 6,276,791 B1
(45) Date of Patent: Aug. 21, 2001

(54) INK JET PRINTING PROCESS

(75) Inventors: Csaba A. Kovacs; Teh-Ming Kung; Charles E. Romano, Jr., all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/216,288

(22) Filed: Dec. 18, 1998

(51) Int. Cl.$^7$ ........................................................ B41J 2/17
(52) U.S. Cl. ............................ 347/98; 347/100; 347/105; 347/95
(58) Field of Search ................................... 347/100, 105, 347/98, 47, 95, 101; 428/195

(56) References Cited

U.S. PATENT DOCUMENTS

| | | | |
|---|---|---|---|
| 5,523,274 | * 6/1996 | Shuttleworth et al. | 503/227 |
| 5,532,064 | * 7/1996 | Lubar | 347/105 |
| 5,837,375 | * 11/1998 | Brault et al. | 428/195 |
| 5,942,465 | * 8/1999 | Burns et al. | 428/195 |
| 6,045,219 | * 4/2000 | Erdtmann et al. | 347/101 |

FOREIGN PATENT DOCUMENTS 10-219157    8/1998   (JP) .

* cited by examiner

*Primary Examiner*—John Barlow
*Assistant Examiner*—M. Shah
(74) *Attorney, Agent, or Firm*—Harold E. Cole

(57) ABSTRACT

An ink jet printing process for improving the light stability and wet abrasion resistance of an ink jet image comprising:

a) providing an ink jet recording element comprising a support having thereon an image-recording layer comprising a cross-linkable polymer of gelatin or acetoacetylated poly(vinyl alcohol) and a mordant;

b) applying liquid ink droplets of a dye on the image-recording layer in an image-wise manner, the dye being a water-soluble deprotonated cationic dye which is capable of being reprotonated to a cationic dye having a N—H group which is part of a conjugated system; and c) applying an aqueous solution of an organic hardener to the image to cross-link the polymer.

9 Claims, No Drawings

INK JET PRINTING PROCESS

CROSS REFERENCE TO RELATED APPLICATION

Reference is made to commonly-assigned copending U.S. patent application Ser. No. 09/216,531, filed of even date herewith, entitled "Ink Jet Printing Process", of Gallo et al; and Copending U.S. patent application Ser. No. 09/215,711, filed of even date herewith, entitled "Ink Jet Printing Process", of Romano, Jr., et al; and Copending U.S. patent application Ser. No. 09/216,558, filed of even date herewith, entitled "Ink Jet Printing Process", of Romano, Jr., et al; and Copending U.S. patent application Ser. No. 09/216,149, filed of even date herewith, entitled "Ink Jet Composition", of Romano, Jr., et al; and Copending U.S. patent application Ser. No. 09/216,653, filed of even date herewith, entitled "Ink Jet Printing Process", of Kovacs et al; and Copending U.S. patent application Ser. No. 09/216,350, filed of even date herewith, entitled "Ink Jet Printing Process", of Kovacs et al; and Copending U.S. patent application Ser. No. 09/216,147, filed of even date herewith, entitled "Ink Jet Ink Composition", of Kovacs et al; and Copending U.S. patent application Ser. No. 09/216,203, filed of even date herewith, entitled "Ink Jet Printing Method", of Romano, Jr., et al; and Copending U.S. patent application Ser. No. 09/216,304, filed of even date herewith, entitled "Ink Jet Printing Method", of Kovacs et al; and Copending U.S. patent application Ser. No. 09/083,875, filed May 22, 1998, entitled "Ink jet Images on PVA Overcoated with Hardener Solution", of Erdtmann et al.; and Copending U.S. patent application Ser. No. 09/083,605 filed May 22, 1998, entitled "Ink Jet Prints Overcoated with Hardener", of Erdtmann et al., the teachings of which are incorporated herein by reference.

FIELD OF THE INVENTION

This invention relates to an ink jet printing process for improving the light stability and wet abrasion resistance of an ink jet image formed from an aqueous ink containing a certain cationic dye.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

DESCRIPTION OF RELATED ART

JP 10-219157 relates to an ink jet ink comprising an aqueous medium, a colorant and a very small amount of glutaraldehyde as a biocide.

There is a problem with using this ink, however, in that when it is printed on an image-recording element, the resultant image fades when exposed to light over a period of time, i.e., has poor light stability. The image also has poor wet abrasion resistance.

It is an object of this invention to provide an ink jet printing process for improving the light stability of an ink jet image formed from an aqueous ink containing a deprotonated cationic dye. It is another object of this invention to provide an ink jet printing process wherein a hardener is applied to improve wet abrasion resistance of the ink jet image. It is another object of the invention to provide an ink jet printing process where the laydown of the hardener applied can be precisely controlled independently of ink laydown and can be applied non-imagewise to the entire element.

SUMMARY OF THE INVENTION

These and other objects are achieved in accordance with the present invention which comprises an ink jet printing process for improving the light stability and wet abrasion resistance of an ink jet image comprising:

a) providing an ink jet recording element comprising a support having thereon an image-recording layer comprising a cross-linkable polymer of gelatin or acetoacetylated poly(vinyl alcohol) and a mordant;

b) applying liquid ink droplets of a dye on the image-recording layer in an image-wise manner the dye being a water-soluble deprotonated cationic dye which is capable of being reprotonated to a cationic dye having a N—H group which is part of a conjugated system; and c) applying an aqueous solution of an organic hardener to the image to cross-link the polymer.

It was found that when an aqueous solution containing a hardener is applied to a cationic dye-based ink image where the image-receiving layer has a cross-linkable polymer and a mordant, that the wet abrasion resistance and light stability of the image is improved.

DETAILED DESCRIPTION OF THE INVENTION

This process offers an advantage over incorporating a hardener in an ink since the hardener can be applied in both imaged and non-imaged areas, and the laydown can be precisely controlled independent of ink laydown.

The hardeners employed in the invention may be used at concentrations ranging from 0.10 to 5.0 weight percent of active ingredient in the aqueous solution, preferably 0.25 to 2.0 weight percent.

The aqueous hardener solution may also contain, if desired, co-solvents, humectants, surfactants, and other ingredients commonly added to ink jet inks.

The organic hardener that can be employed in the invention include the following (including mixtures thereof):

a) formaldehyde and compounds that contain two or more aldehyde functional groups such as the homologous series of dialdehydes ranging from glyoxal to adipaldehyde including succinaldehyde and glutaraldehyde; diglycolaldehyde; aromatic dialdehydes, etc.;

b) blocked hardeners (substances usually derived from the active hardener that release the active compound under appropriate conditions) such as substances that contain blocked aldehyde functional groups, such as tetrahydro-4-hydroxy-5-methyl-2(1H)-pyrimidinone polymers, polymers of the type having a glyoxal polyol reaction product consisting of 1 anhydroglucose unit: 2 glyoxal units, dimethoxylethanal-melamine non-formaldehyde resins, 2,3-dihydroxy-1,4-dioxane, blocked dialdehydes and N-methylol compounds obtained from the condensation of formaldehyde with various aliphatic or cyclic amides, ureas, and nitrogen heterocycles; and c) active olefinic compounds having two or more olefinic bonds, especially unsubstituted vinyl groups, activated by adjacent electron withdrawing groups, such as divinyl ketone; resorcinol bis(vinylsulfonate); 4,6-bis (vinylsulfonyl)-m-xylene; bis(vinylsulfonylalkyl) ethers and amines; 1,3,5-tris(vinylsulfonyl) hexahydro-s-triazine; diacrylamide; 1,3-bis(acryloyl)urea; N,N'-bismaleimides; bisisomaleimides; bis(2-acetoxyethyl) ketone; 1,3,5-triacryloylhexahydro-s-triazine; and blocked active olefins of the type bis(2-acetoxyethyl) ketone and 3,8-dioxodecane-1,10-bis(pyridinium perchlorate) bis(vinyl sulfonylmethane), bis(vinyl sulfonylmethyl ether), and the like.

Specific examples of hardeners useful in the process of the invention include the following:

Hardener 1: formaldehyde
Hardener 2: bis(vinyl sulfonylmethane) (Eastman Kodak Company)
Hardener 3: 2,3-dihydroxy-1,4-dioxane (Aldrich Chemical Co.)
Hardener 4: blocked hexamethylene diisocyanate (Bayer Co.)
Hardener 5: glyoxal
Hardener 6: bis(vinyl sulfonylmethyl ether) (Eastman Kodak Company)
Hardener 7: glutaraldehyde
Hardener 8: a glyoxal polyol reaction product consisting of 1 anhydroglucose unit:2 glyoxal units, SEQUAREZ® 755 (Sequa Chemicals, Inc.)
Hardener 9: a cyclic urea glyoxal condensate consisting of 1 cyclic urea unit: 1 glyoxal unit, SUNREZ® 700M (Sequa Chemicals, Inc.)
Hardener 10: dimethoxylethanal-melamine non-formaldehyde resin, Sequa CPD3086-100 (Sequa Chemicals, Inc)
Hardener 11: phthaldehyde
Hardener 12: formaldehyde In a preferred embodiment, the hardener employed in the invention is bis(vinyl sulfonylmethane), 2,3-dihydroxy-1,4-dioxane, glutaraldehyde or formaldehyde.

The aqueous hardener solution may be applied to the ink jet image in accordance with the invention in a non-imagewise manner either through a separate thermal or piezoelectric printhead, or by any other method which would apply the hardener solution evenly to the image, such as a spray bar or immersing the element in a bath of hardener. Methods of applying a hardener solution are disclosed in commonly-owned U.S. patent application Ser. No. 09/083,673 filed May 22, 1998, entitled "Printing Apparatus With Spray Bar For Improved Durability" of Wen et al. and U.S. patent application Ser. No. 09/083,876, filed May 22, 1998, entitled "Ink Jet Printing Apparatus With Print Head For Improved Image Quality" of Wen et al., the disclosures of which are incorporated herein by reference.

Deprotonated cationic dyes useful in the invention which are capable of being reprotonated to a cationic dye having a N—H group which is part of a conjugated system are described in U.S. Pat. No. 5,523,274, the disclosure of which is hereby incorporated by reference.

In a preferred embodiment of the invention, the deprotonated cationic dye employed in the invention and the corresponding cationic dye having a N—H group which is part of a conjugated system have the following structures:

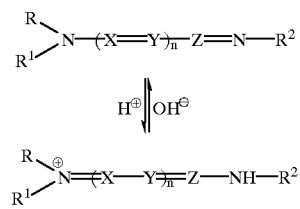

wherein:

X, Y and Z form a conjugated link between nitrogen atoms selected from CH, C-alkyl, N, or a combination thereof, the conjugated link optionally forming part of an aromatic or heterocyclic ring;

R represents a substituted or unsubstituted alkyl group from about 1 to about 10 carbon atoms;

$R^1$ and $R^2$ each individually represents a substituted or unsubstituted phenyl or naphthyl group or a substituted or unsubstituted alkyl group from about 1 to about 10 carbon atoms; and n is an integer of from 0 to 11.

The deprotonated cationic dyes according to the above formula are disclosed in U.S. Pat. Nos. 4,880,769, 4,137,042 and 5,559,076, and in K. Venkataraman ed., *The Chemistry of Synthetic Dyes,* Vol. IV, p. 161, Academic Press, 1971, the disclosures of which are hereby incorporated by reference. Specific examples of such dyes include the following (the λ max values and color descriptions in parentheses refer to the dye in its protonated form):

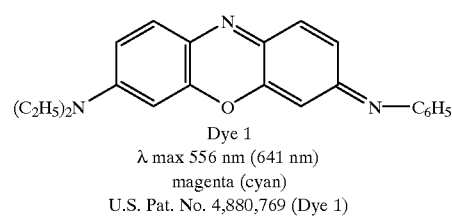

Dye 1
λ max 556 nm (641 nm)
magenta (cyan)
U.S. Pat. No. 4,880,769 (Dye 1)

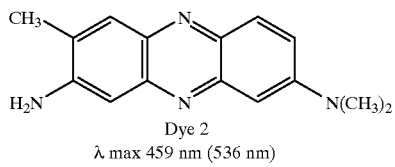

Dye 2
λ max 459 nm (536 nm)
yellow (magenta)

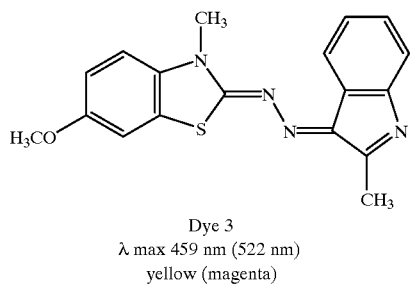

Dye 3
λ max 459 nm (522 nm)
yellow (magenta)

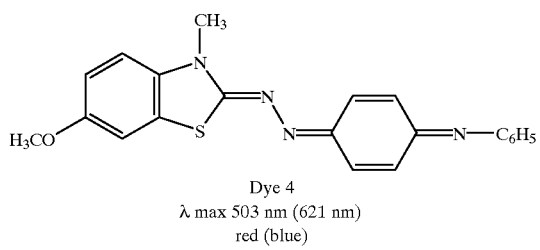

Dye 4
λ max 503 nm (621 nm)
red (blue)

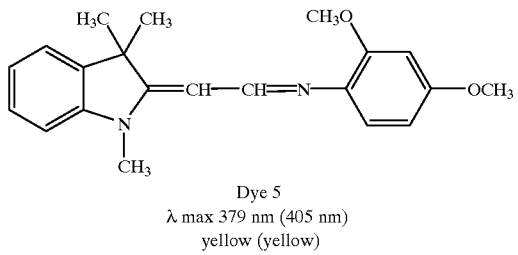

Dye 5
λ max 379 nm (405 nm)
yellow (yellow)

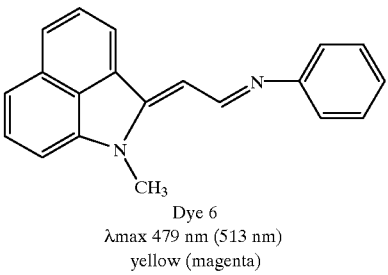

Dye 6
λmax 479 nm (513 nm)
yellow (magenta)

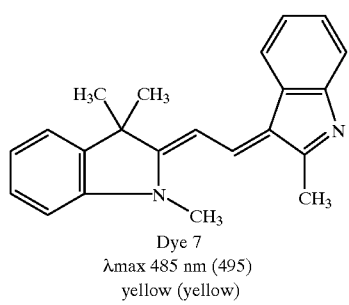

Dye 7
λmax 485 nm (495)
yellow (yellow)

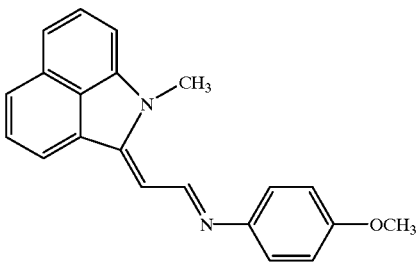

Dye 8
yellow (magenta)
U.S. Pat. No. 5,559,076 (dye precursor 5)

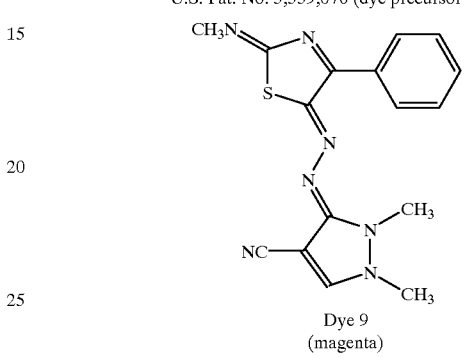

Dye 9
(magenta)

The dyes described above may be employed in any amount effective for the intended purpose. In general, good results have been obtained when the dye is present in an amount of from about 0.05 to about 1.0 g/m$^2$, preferably from about 0.1 to about 0.5 g/m$^2$. Dye mixtures may also be used.

A mordant can be used in the image-recording element used in the invention to fix the deprotonated cationic dye. For example, there may be used an anionic polymer such as sulfonated and carboxylated polyesters, sulfonated and carboxylated acrylates, poly(vinyl sulfonic acid), poly(vinyl styrene sulfonate sodium salt), sulfonated and carboxylated polyurethanes, sulfonated polyamides, polyolefinic emulsions, carboxylated butadiene, or derivitized anionic gelatin. In a preferred embodiment, the following mordants may be employed in a recording element used in the invention:

Mordant 1 polyester dispersion AQ29 (Eastman Chemical Co.)
Mordant 2 polyester dispersion AQ38 (Eastman Chemical Co.)
Mordant 3 polyester dispersion AQ48 (Eastman Chemical Co.)
Mordant 4 polyester dispersion AQ55 (Eastman Chemical Co.)
Mordant 5 polyester dispersion AQ1045(Eastman Chemical Co.)
Mordant 6 sulfonated polyester EvCote® EV-LC (EvCo Research Co.)
Mordant 7 carboxylated polyester EvCote® EV-565 (EvCo Research Co.)

The above mordants may be employed in any amount effective for the intended purpose. In general, good results are obtained when the mordant is present in an amount of from about 0.5 to about 5 g/m$^2$ of element.

As noted above, the cross-linkable polymer employed in the invention is gelatin or acetoacetylated poly(vinyl alcohol). Gelatin which may be used include the conventional lime-processed ossein, acid-processed ossein or pig skin gelatin. In addition, there are a variety of chemically-modified gelatins formed by reacting the amino group of lysine which can be used. Some functional groups that have been added to gelatin include: phthalate, phenylcarbamyl, succinyl, carbamyl, lauryl, and dodecenyl succinyl. There can also be used quaternized gel, silanol modified gel, and graft copolymers of gel with poly(styrene sulfonate), poly (vinylpyrrolidone), and poly(methacrylic acid).

The acetoacetylated poly(vinyl alcohol) useful in the invention is described in U.S. Pat. No. 4,350, 788, the disclosure of which is hereby incorporated by reference. These materials are available commercially as Gohsefimer® Z-200 from Nippon Gohsei.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV- absorbing agents; mildew-proofing agents; mordants; antistatic agents, anti-oxidants, optical brighteners, and the like. A hardener may also be added to the ink-receiving layer if desired.

Ink jet inks used in the process of the present invention are well-known in the art. The ink compositions used in ink jet printing typically are liquid compositions comprising a solvent or carrier liquid, dyes, humectants, organic solvents, detergents, thickeners, preservatives, conductivity enhancing agents, anti-kogation agents, drying agents, defoamers, etc. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols.

A carrier can be present in the ink jet ink and can vary widely, depending on the nature of the ink jet printer for which the inks are intended. For printers which use aqueous inks, water, or a mixture of water with miscible organic co-solvents, is the preferred carrier medium. Co-solvents (0–20 wt. % of the ink) are added to help prevent the ink from drying out or crusting in the orifices of the printhead or to help the ink penetrate the receiving substrate. Preferred co-solvents for the inks employed in the present invention include glycerol, ethylene glycol, propylene glycol, 2-methyl-2,4-pentanediol, and diethylene glycol, and mixtures thereof, at overall concentrations ranging from 5 to 20 wt. % of the ink.

The support for the ink jet recording element used in the invention can be any of those usually used for ink jet receivers, such as paper, resin-coated paper, poly(ethylene terephthalate), poly(ethylene naphthalate) and microporous materials such as poly polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861.

The support used in the invention may have a thickness of from about 50 to about 500 µm, preferably from about 75 to 300 µm. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 µm.

The image-recording layer may be present in any amount which is effective for the intended purpose. In general, good results are obtained when it is present in an amount of from about 5 to about 30 g/m$^2$, preferably from about 8 to about 15 g/m$^2$, which corresponds to a dry thickness of about 5 to about 30 µm, preferably about 8 to about 15 µm.

The following examples are provided to illustrate the invention.

EXAMPLES

Example 1

Control Example C-1

Preparation of Receiver A

A photographic grade, polyethylene resin-coated paper was given a corona discharge treatment and then coated with an ink-receiving layer of Mordant 4 (3.7 g/m$^2$), lime-processed Ossein photographic gelatin (Eastman Gelatin) (5.5 g/m$^2$) and styrene-butadiene polymeric beads (0.11 g/m$^2$) having an average size of 20 µm. The layer was coated from distilled water.

Preparation of Magenta Ink

An ink was prepared by dissolving 5 parts by weight magenta dye 9 described above with stirring in a mixture of 60 parts glycerol humectant, 60 parts diethylene glycol humectant, 3 parts of Surfynol® 465 surfactant, 1 part of 10% Proxel® GXL biocide in water, 8 parts of 85% lactic acid in water (to protonate the dye) and 860 parts of deionized water as the solvent.

Printing

The top of a black ink cartridge of an Epson 200 ink jet printer was opened with a knife. The Epson ink and the sponge were removed and the cartridge was washed with water and ethanol and dried. The sponge was replaced with a Willtec® (Illbruck Co.) sponge. The cyan ink described above was filtered with a Autovial® 0.45 µm membrane filter (Whatman, Cat. No. AV125UGMF) and the cartridge was filled with the filtered cyan ink. The top of the black cartridge was re-sealed with Permacel® tape (Permacel Company, P-252). A twenty-one step density tablet was printed on Receiver A at 100% laydown using an Epson 200 printer at 360 dpi resolution.

Light Fade Test

After the highest density step of the twenty-one step tablet was measured with an X-Rite® densitometer, the strip was exposed for seven days to simulated daylight by a method recommended by the Image Stability Technical Center for standard. 50 klux Daylight exposure (ANSI IT9.9—1990 "Stability of Color Photographic Images" Section 5 Paragraph 5.6 Describes Simulated Indoor Indirect Daylight exposure). After seven days exposure, the optical density of the highest density step was re-measured. To calculate the percent optical density retained, the optical density value at λ-max after seven days light exposure was divided by the optical density value at λ-max before light exposure and the resulting number was multiplied by one-hundred. The results are shown in Table 1.

Invention Example 1

This example was the same as Control Example C-1 except that after printing, the image was submerged for five minutes in a 2% solution of Hardener 2 in water. It was dried at ambient temperature. The same light stability test and calculation method was employed as in Example 1. This element was tested as in Control Example C-1. The results are shown in Table 1.

Invention Example 2

This example was the same as Invention Example 1 except that the hardener was Hardener 3. The results are shown in Table 1.

TABLE 1

| Hardener | Retained Optical Density |
|---|---|
| None (Control C-1) | 76 |
| 2 | 92 |
| 3 | 92 |

The above results show that an ink jet image obtained in accordance with the invention has superior light stability as compared to a control element which was not treated with a hardener solution.

Example 2

Control Example C-2
Preparation of Receiver B

A photographic grade, polyethylene resin-coated paper was given a corona discharge treatment. It was then coated with a solvent-absorbing layer of lime-processed Ossein photographic gelatin (Eastman Gelatin Co.) (6.05 g/m$^2$) and then an ink-receiving layer of Mordant 5 (2.42 g/m$^2$), lime-processed Ossein photographic gelatin (Eastman Gelatin) (0.77 g/m$^2$) and styrene-butadiene polymeric beads (0.1 1 g/m$^2$) having an average size of 10 μm. The layers were coated from distilled water.

Receiver B was tested the same as in Example 1 using the same ink. The results are shown in Table 2.

Invention Example 3

This example was the same as Control Example C-2, except that after printing, the image was submerged for five minutes in a 2% solution of Hardener 2 in water. The results are shown in Table 2.

Invention Example 4

This example was the same as Control Example C-2, except that after printing, the image was submerged for five minutes in a 2% solution of Hardener 3 in water. The results are shown in Table 2.

TABLE 2

| Hardener | Retained Optical Density |
|---|---|
| None (Control C-2) | 74 |
| 2 | 83 |
| 3 | 85 |

The above results show that an ink jet image obtained in accordance with the invention has superior light stability as compared to a control element which was not treated with a hardener solution.

Example 3

Control Example C-3
Preparation of Receiver C

A 102 μm poly(ethylene terephthalate) film support was coated with a subbing layer of acrylonitrile-vinylidene chloride-acrylic acid terpolymer latex (0.11 g/m$^2$). On top of the subbing layer was coated a solvent-absorbing layer of lime-processed Ossein photographic gelatin (Eastman Gelatin) (6.05 g/m$^2$) Over this layer was coated an ink-receiving layer of Mordant 4 (0.77 g/m$^2$), lime-processed Ossein photographic gelatin (2.42 g/m$^2$) and styrene-butadiene polymeric beads (0.11 g/m$^2$) having an average size of 10 μm.
Preparation of Cyan Ink This ink was prepared the same as the magenta ink except that cyan dye 1 illustrated above was employed.
Printing The top of a black ink cartridge of an Epson 200 ink jet printer was opened with a knife. The Epson ink and the sponge were removed and the cartridge was washed with water and ethanol and dried. The sponge was replaced with a Willtec® (Illbruck Co.) sponge. The cyan ink was filtered with a Autovial ® 0.45 μm membrane filter (Whatman, Cat. No. AV125UGMF) and the cartridge was filled with the filtered cyan ink. The top of the black cartridge was re-sealed with Permacel® tape (Permacel Company, P-252). A 18 cm×23 cm print at 100% laydown was made using the Epson 200 printer at 360 dpi resolution on Receiver A.

Three full spectral measurements were taken from 340 nm to 800 nm at 4 cm from the print edges and one at center of one strip with a Hewlett-Packard 8450A Diode Array spectrophotometer. The strip was soaked for 30 minutes in deionized water. While still wet, the strips were secured on a metal bar with a 500 g load on top. The strips were then placed on a wet sponge, 4 cm wide Willtec® (Illbruck Co.) and rubbed 10 times. The strips were then allowed to dry at ambient temperature overnight and re-measured at the same three locations as above. The percent total retained optical density was calculated by dividing the average optical density measured from the base line to the peak at maximum absorption after the rub by the average optical density measured from the base line to the peak at maximum absorption before the rub and multiplying the result by one hundred. The results are shown in Table 3.

Invention Example 5

This element was printed and tested as in Control C-3, except for treatment with a hardener solution as follows. Four strips were cut. Separate strip were soaked for five minutes a Hardener 3 in solution in various concentrations in deionized water. The strips were dried at ambient temperature. The results are shown in Table 3.

TABLE 3

| % Concentration of Hardener 3 Solution | % Total Retained Optical Density |
|---|---|
| 0.0 (control) | 24 |
| 0.25 | 94 |
| 0.5 | 100 |
| 1.0 | 105 |

TABLE 3-continued

| % Concentration of Hardener 3 Solution | % Total Retained Optical Density |
|---|---|
| 2.0 | 99 |

The above results show an ink jet image obtained in accordance with the invention has superior wet abrasion resistance as compared to a control element which was not treated with a hardener solution.

Example 4

This example was the same as Example 3 except that Receiver D was used and different hardeners were used as shown in Table 4, including control hardeners of zinc sulfate and aluminum nitrate.

Preparation of Receiver D

A 102 μm poly(ethylene terephthalate) film support was coated with a subbing layer of acrylonitrile-vinylidene chloride-acrylic acid terpolymer latex (0.11 g/m$^2$). On top of the subbing layer was coated a solvent-absorbing layer of Mordant 4 (3.3 g/m$^2$), lime-processed Ossein photographic gelatin (Eastman Gelatin) (3.74 g/m$^2$) and styrene-butadiene polymeric beads (0.11 g/m$^2$) having an average size of 10 μm. Over this layer was coated an ink-receiving layer of Mordant 4 (0.44 g/m$^2$) and lime-processed Ossein photographic gelatin (1.76 g/m$^2$).

TABLE 4

| Hardener | % Total Retained Optical Density |
|---|---|
| Zinc sulfate (control) | 13 |
| Aluminum nitrate (control) | 13 |
| 2 | 99 |
| 7 | 100 |
| 12 | 100 |

The above results show that an ink jet image obtained in accordance with the invention has superior wet abrasion resistance as compared to the control elements with inorganic hardeners.

Example 5

Preparation of Receiver E

A 102 μm poly(ethylene terephthalate) film support was coated with a subbing layer of acrylonitrile-vinylidene chloride-acrylic acid terpolymer latex (0.11 g/m$^2$). On top of the subbing layer was coated an ink-receiving layer of Mordant 4 (3.70 g/m$^2$), acetoacetylated poly(vinyl alcohol), Gohsefimer® Z-200 (Nippon Gohsei) (5.54 g/m$^2$) and styrene-butadiene polymeric beads (0.11 g/m$^2$) having an average size of 20 μm.

This example was the same as Example 2 except that Receiver E was used and a different hardener was used as shown in Table 5 along with a control where no hardener was used.

TABLE 5

| Hardener | % Total Retained Optical Density |
|---|---|
| No Hardener | 0 |
| 3 | 80 |

The above results show an ink jet image obtained in accordance with the invention has superior wet abrasion resistance as compared to a control element which was not treated with a hardener solution.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet printing process for improving the light stability and wet abrasion resistance of an ink jet image comprising:

a) providing an ink jet recording element comprising a support having thereon an image-recording layer comprising a cross-linkable polymer of gelatin or acetoacetylated poly(vinyl alcohol) and a mordant;

b) applying liquid ink droplets of a dye on said image-recording layer in an image-wise manner, said dye being a water-soluble deprotonated cationic dye which is capable of being reprotonated to a cationic dye having a N—H group which is part of a conjugated system; and c) applying an aqueous solution of an organic hardener to said image to cross-link said polymer.

2. The process of claim 1 wherein said solution of a hardener is applied by means of an ink jet print head.

3. The process of claim 1 wherein said solution of a hardener is applied by submerging said element in said aqueous solution of hardener to cross-link said polymer.

4. The process of claim 1 wherein said support is paper.

5. The process of claim 1 wherein said cross-linkable polymer is present in an amount of from about 5 to about 30 g/m$^2$.

6. The process of claim 1 wherein said mordant is a polyester dispersion in water.

7. The process of claim 1 wherein said mordant is present in an amount of from about 0.5 to about 5 g/m$^2$.

8. The process of claim 1 wherein said hardener is bis(vinyl sulfonylmethane), 2,3-dihydroxy-1,4-dioxane, glutaraldehyde or formaldehyde.

9. The process of claim 1 wherein said liquid ink has a water carrier.

* * * * *